United States Patent
Williamson et al.

(10) Patent No.: US 11,086,600 B2
(45) Date of Patent: *Aug. 10, 2021

(54) BACK-END APPLICATION CODE STUB GENERATION FROM A FRONT-END APPLICATION WIREFRAME

(71) Applicant: International Business Machines Corporation, Armonk, NY (US)

(72) Inventors: Leigh Williamson, Austin, TX (US); Roger Snook, Charles Town, WV (US); Shinoj Zacharias, Bangalore (IN); Vijay Ekambaram, Tamilnadu (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 65 days.

This patent is subject to a terminal disclaimer.

(21) Appl. No.: 16/538,224

(22) Filed: Aug. 12, 2019

(65) Prior Publication Data
US 2021/0011693 A1     Jan. 14, 2021

Related U.S. Application Data

(63) Continuation of application No. 16/504,996, filed on Jul. 8, 2019.

(51) Int. Cl.
*G06F 9/44*          (2018.01)
*G06F 8/34*          (2018.01)
(Continued)

(52) U.S. Cl.
CPC ............... *G06F 8/34* (2013.01); *G06F 8/36* (2013.01); *G06F 8/38* (2013.01); *G06F 8/75* (2013.01);
(Continued)

(58) Field of Classification Search
CPC ..... G09B 19/0053; G06F 40/30; G06F 40/20; G06F 16/951; G06F 16/30; G06F 8/75;
(Continued)

(56) References Cited

U.S. PATENT DOCUMENTS

| 7,493,253 | B1 * | 2/2009 | Ceusters | G06F 40/30 |
| | | | | 704/9 |
| 7,912,701 | B1 * | 3/2011 | Gray | G06F 40/20 |
| | | | | 704/9 |

(Continued)

OTHER PUBLICATIONS

List of all IBM related dockets. Appendix P. 2019.

*Primary Examiner* — Tuan A Vu
(74) *Attorney, Agent, or Firm* — Garg Law Firm, PLLC; Rakesh Garg; Alexander Jochym

(57) ABSTRACT

As part of identifying a theme corresponding to a wireframe, the wireframe comprising a set of graphical elements is analyzed, the set of graphical elements specifying a graphical representation of a user interface of a front-end application. A similarity measure is computed, the similarity measure quantifying a degree of similarity between the theme and an entry in a feature implementation history stored in a code repository. From the entry, a first feature to be implemented in a back-end application is extracted, the first feature servicing a data request from the front-end application. A source code stub extracted from the code repository, comprising a partial implementation of the first feature in the back-end application, is coupled with a first graphical element in the set of graphical elements in the wireframe.

6 Claims, 10 Drawing Sheets

(51) Int. Cl.
*G06F 8/38* (2018.01)
*G06F 8/36* (2018.01)
*G06N 3/04* (2006.01)
*G06F 8/75* (2018.01)
*G06F 11/07* (2006.01)
*G06N 20/00* (2019.01)
*G06K 9/62* (2006.01)

(52) U.S. Cl.
CPC ......... *G06F 11/079* (2013.01); *G06N 3/0454* (2013.01); *G06K 9/6269* (2013.01); *G06N 20/00* (2019.01)

(58) Field of Classification Search
CPC . G06F 11/079; G06F 8/38; G06F 8/34; G06F 8/36; G06K 9/6269; G06N 20/00; G06N 3/0454
See application file for complete search history.

(56) References Cited

U.S. PATENT DOCUMENTS

| | | | |
|---|---|---|---|
| 2004/0172415 A1* | 9/2004 | Messina | G06F 16/951 |
| 2016/0321069 A1* | 11/2016 | Chen | G06F 8/75 |
| 2017/0291295 A1* | 10/2017 | Gupta | G09B 19/0053 |
| 2018/0082191 A1* | 3/2018 | Pearmain | G06K 9/6269 |
| 2019/0243841 A1* | 8/2019 | Hoffmann | G06F 16/30 |
| 2019/0286757 A1* | 9/2019 | Muntes-Mulero | G06F 11/079 |
| 2020/0183663 A1* | 6/2020 | Krishnamoorthy | G06N 3/0454 |
| 2020/0320133 A1* | 10/2020 | Yaramada | G06N 20/00 |

* cited by examiner

BACK-END APPLICATION CODE STUB GENERATION FROM A FRONT-END APPLICATION WIREFRAME

TECHNICAL FIELD

The present invention relates generally to a method for application code stub generation. More particularly, the present invention relates to a method for back-end application code stub generation from a front-end application wireframe.

BACKGROUND

As used herein, a wireframe is a visual blueprint of a page of a website or application, representing, in schematic form, a user interface of the website or application. A wireframe includes information on placement and space allocation of the visual elements of the page, content prioritization, functionalities the website or application implements, and intended behavior of those functionalities. Analogously to a text outline for a document, which includes an ordered set of topics corresponding to sections of document text, but not including actual document text, a wireframe provides a schematic of the user-facing elements of a website or application, but does not include an implementation of those elements. For example, a wireframe for a login page of a website might include a title (e.g. "Login Here"), a text entry box labeled "username", and a text entry box labeled "password". A wireframe does not have a fixed level of detail, but includes enough detail to serve the needs of users including user-interface designers, application implementors, and decision makers.

Within the scope of the illustrative embodiments, a front-end application is software, implemented as an application or a website, that implements the elements depicted in a wireframe. In other words, a front-end application implements a presentation layer of an application or website. For example, to implement a login page, a front-end application might include code implementing a text entry box labeled "username" and a text entry box labeled "password".

Within the scope of the illustrative embodiments, a back-end application implements a computation, data manipulation, data access, hardware access, or some combination thereof, for a front-end application. Continuing the login page example, once a user enters information in username and password text entry boxes, a front-end application might send the entered data to a back-end application for validation that the information entered corresponds to a current user account. The front-end application then updates information presented to a user, based on the back-end application's response.

A stub is a piece of software code used to stand in for some other programming functionality. A stub is often used as a temporary substitute for yet-to-be-developed code. Typically, a stub contains just enough code to allow the stub to be integrated into a working application, but simply operates in a manner, e.g., by returning a constant value, that will not cause an error in the remainder of the application. Stubs are used commonly as placeholders during the implementation of a known interface, where the interface is known but is still being implemented.

A front-end application and a back-end application, as described herein, can be implemented as separate applications, combined into one application, or in one or more modules combining front-end and back-end functionality. In addition, front-end and back-end functionality can be implemented as a standalone application, as a portion of a website, in combination with another application, or as any combination thereof. As well, front-end and back-end functionality can be implemented in the same system or in different systems. For example, when implemented in a client-server model, a front-end application is typically referred to as a client application and a back-end application is typically referred to as a server application. Although referred to herein as a front-end application and a back-end application, a front-end application includes any implementation of front-end functionality, and a back-end application includes any implementation of back-end functionality.

SUMMARY

The illustrative embodiments provide a method. An embodiment includes a method that analyzes, as part of identifying a theme corresponding to a wireframe, the wireframe comprising a set of graphical elements, the set of graphical elements specifying a graphical representation of a user interface of a front-end application. An embodiment computes a similarity measure, the similarity measure quantifying a degree of similarity between the theme and an entry in a feature implementation history stored in a code repository. An embodiment extracts, from the entry, a first feature to be implemented in a back-end application, the first feature servicing a data request from the front-end application. An embodiment coupling a source code stub extracted from the code repository, comprising a partial implementation of the first feature in the back-end application, with a first graphical element in the set of graphical elements in the wireframe.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
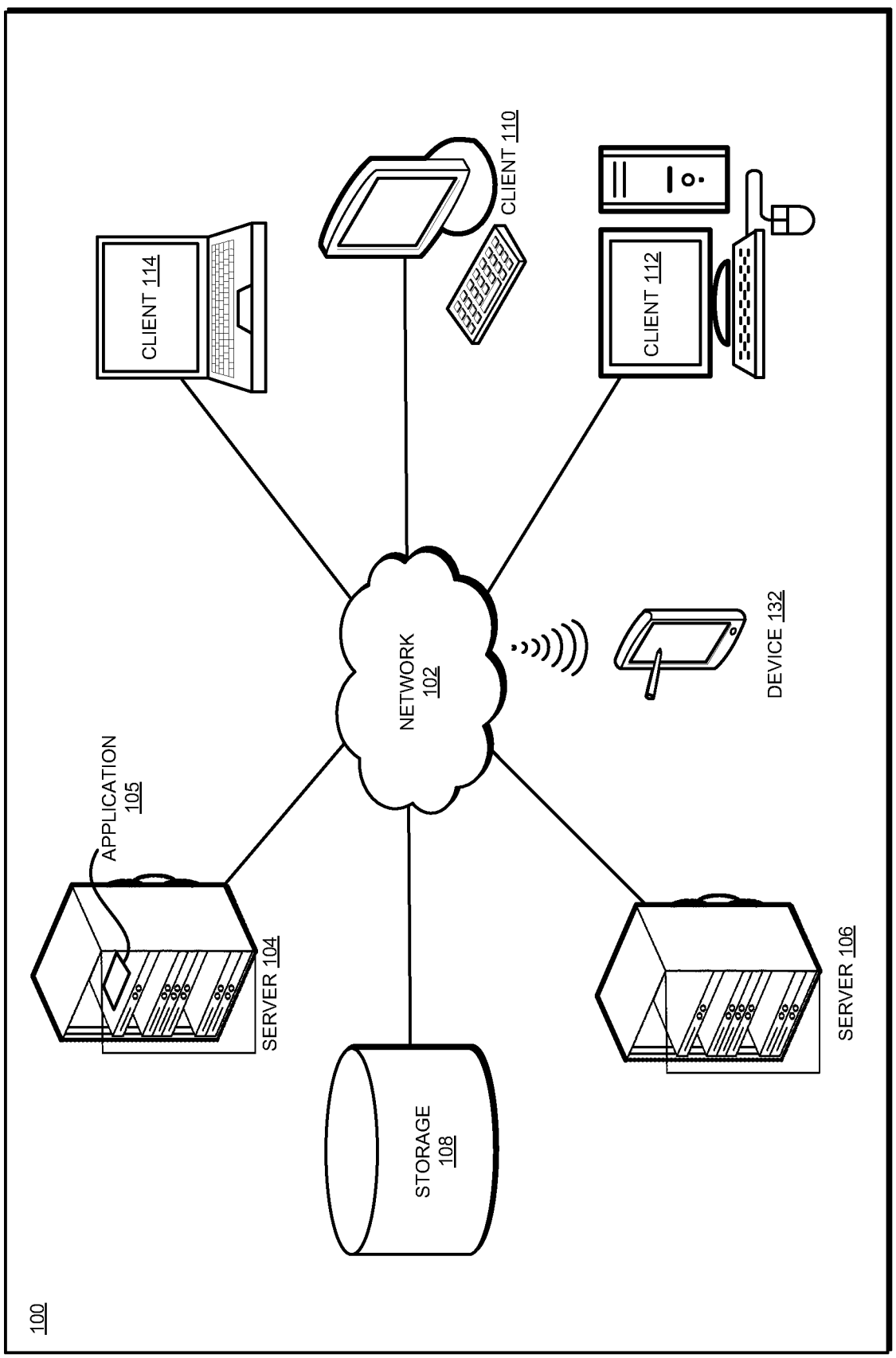
FIG. 1 depicts a block diagram of a network of data processing systems in which illustrative embodiments may be implemented.

Wireframe tools currently exist to implement front-end application code from a wireframe. However, the illustrative embodiments recognize that wireframe tools implement only the front-end application code. Without additional labor, the automatically-generated front-end code can attempt to access data using unimplemented back-end application functionality.

The illustrative embodiments also recognize that determining, from the front-end code, back-end functionality to implement is time-consuming and error prone. Because a typical user interface uses many common elements, there is unlikely to be a one-to-one correspondence between front-end code and the back-end functionality the front-end code requires. As a result, each unit of generated front-end code must be scrutinized to determine back-end functionality required to service the front-end code; then the back-end functionality must be implemented and tested. Further, although many front-end applications require some common back-end functionality (e.g., validating login information), much back-end functionality is specific to a particular front-end application, implementation of data or system in a back-end environment, or both. Consequently, the illustrative embodiments recognize that there is an unmet need to generate back-end stubs corresponding to front-end code generated from a particular wireframe. Once back-end stubs have been generated, a human developer, or a suitably configured code-generation system, can more easily and systematically convert each stub to full functionality.

The illustrative embodiments recognize that the presently available tools or solutions do not address these needs or provide adequate solutions for these needs. The illustrative embodiments used to describe the invention generally address and solve the above-described problems and other problems related to back-end application code stub generation from a front-end application wireframe.

An embodiment can be implemented as a software application. The application implementing an embodiment can be configured as a modification of an existing code generation system, as a separate application that operates in conjunction with an existing code generation system, a standalone application, or some combination thereof.

Particularly, some illustrative embodiments provide a method to generate back-end stubs corresponding to front-end code generated from a particular wireframe.

An embodiment receives a wireframe from which to generate front-end code and corresponding back-end stubs. The wireframe, as received, includes a set of user-facing graphical elements. Each element includes layout information for the element, such as a bitmap or other graphical or textual representation of an element, as well as an element's size, shape, color, location relative to other elements in a display, and the like. Each element can also include textual information, such as a text string, font and font size specification for the text, and the like. For example, a wireframe element for a warning message might include the text of the warning message, and a specification that the warning should be displayed in red, centered horizontally and vertically within the display, and in 18 point Arial Bold font.

If necessary, an embodiment performs optical character recognition (OCR) on the set of user-facing graphical elements. OCR converts an image of typed, handwritten, or printed text into machine-encoded text. For example, OCR can be used to convert an image of a letter "z", in a particular font to a code corresponding to "z" (for example, the number 122, in the American Standard Code for Information Interchange (ASCII) format). Converting text of the wireframe to machine-encoded form allows the use of numerous existing text analysis tools for string searching, sorting, and comparison.

An embodiment analyzes elements of a wireframe to identify a theme of the wireframe. A theme, as used herein, is a semantic representation of a wireframe, or a portion of a wireframe. For example, a wireframe for a travel application might have a theme of "travel". The same example wireframe might have different portions (e.g. pages), one for flight reservations, a second for hotel reservations, and a third for ground transportation reservations, and each portion could have a corresponding theme such as "flight", "hotel", and "ground".

To identify a theme, an embodiment attempts to identify a title for the wireframe, then uses the identified title as the theme. A title, as used herein, is a textual element of a wireframe that describes a wireframe, or a portion of a wireframe.

A title for a page, section, or entire application or website is often the most prominent text in a region. Making use of this observation, one embodiment sorts the graphical elements of the wireframe by a typographical attribute of the elements, then selects the text of the element at one end of the sorted list as the theme. One embodiment identifies the most prominent text in a wireframe by sorting by the font size of each element, then selecting the element having the largest font size. If there are multiple elements with the same largest font size, the embodiment breaks the tie using another typographical attribute of the elements, such as an alignment or font of the elements. For example, if there are four elements in a wireframe with the same largest font size, but only one is also centered on the page, or only one is in bold type, that element is likely to contain the title of the wireframe. Another embodiment searches the text itself for an element including text that indicates a title. For example, text that indicates a title might be "Title: Flights", for a travel reservation wireframe, or "Chapter 1: Jack and Jill" for a wireframe relating to stories for children.

Another textual element of a wireframe, such as a legend or an index, or a portion of a legend or an index, can also serve as a wireframe title. Making use of this observation, another embodiment attempts to identify a title using a set of rules delineating text or typographical elements that are typical of a wireframe textual element serving as a title.

Another embodiment identifies a wireframe title using a learning model previously trained to identify wireframe titles using a set of training wireframes. Another embodiment identifies a wireframe title using a set of static rules. Using a set of static rules is particularly effective when most of the wireframes being processed share a common look and feel or follow a set of best practices.

If an embodiment cannot identify a title for the wireframe—for example, for a wireframe without a title element, or a wireframe that does not conform to common design practices—an embodiment attempts to identify a theme for the wireframe using the text of the graphical elements in the wireframe. One embodiment classifies text of the elements in the wireframe into a theme based on a static set of rules. For example, if the text of a wireframe consists of "username:" and "password", this wireframe has a higher probability of relating to logging in than to any other known theme. Similarly, if the text of a wireframe includes text such as "TripType", "NumPassengers", "City1", "City2", "Date1", and "Date2", this wireframe has a higher probability of relating to travel reservations than to any other known theme.

Another embodiment classifies text of the elements in the wireframe into a theme based on a learning model previously trained to identify a theme from sets of textual training data. Another embodiment classifies text of the elements in the wireframe into a theme using a combination of static rules and a learning model, or using another technique.

If an embodiment cannot identify a title for the wireframe, an embodiment with access to a reference repository of user interface information searches within the reference repository for a user interface layout, with a title, that is above a threshold degree of similarity (as measured by a similarity measure) with the elements of the wireframe being analyzed. The embodiment then uses the title as the theme.

To compute a similarity measure, an embodiment can be configured to use any suitable technique for determining semantic similarity. For example, one technique for determining semantic similarity is to convert each text element in the wireframe to a vector representation (i.e., a numerical representation of text, techniques for which are known), add each of the vector representations together, and compute a cosine similarity with the sum of vector representations of each text element in the layout to which the wireframe is being compared. Other techniques for determining semantic similarity are also possible and contemplated within the scope of the illustrative embodiments.

An embodiment can be configured to use, as the reference repository of user interface information, a reference collection of standard, or often-used, user interface layouts that is collated and preprocessed for an embodiment's use. Alternatively, an embodiment can be configured to use, as the reference repository, a publicly-available collection of websites or the user interfaces of front-end applications, such as those available on a publicly-accessible computer network such as the Internet.

Once an embodiment has identified a theme, the embodiment searches a code repository to discover one or more entries related to the theme. A feature, as used herein, is an increment in program functionality. For example, one feature in a travel application could be implementing an ability to search for one-way trips, another feature could be implementing an ability to search for round trips, and a third feature could be fixing a bug in the round trip search logic.

A code repository stores information relating to feature implementation for one or more software projects. A code repository typically includes information relating to software version control, bug tracking, feature requests, task management, and other information relating to feature implementation. A code repository also relates information about a feature implementation (referred to herein as feature metadata) to source code of the implementation. For example, information stored in a code repository for implementing the example travel application might include an entry specifying that change 1 to source code module 1, change 2 to source code module 2, and change 3 to source code module 3 are all associated with an implementation of the one-way trip feature. The example code repository might also store items such as a software version and target implementation dates for the one-way and round-trip search features, as well as a running, prioritized list of bugs requiring resolution. A code repository can be a publicly-available, general-use repository, commercially available library, or specifically designed for use in a particular style of software development or restricted to a particular group of developers. For example, one commonly-used publicly-available, general-use code repository is GitHub. (GitHub is a trademark of GitHub, Inc. in the United States and other countries.)

To discover one or more entries related to the theme, as stored in the code repository, an embodiment searches the repository for one or more keywords that are the same or semantically similar (above a threshold degree of similarity as measured by a similarity measure in a manner described herein) to the theme or the text of elements in the wireframe. An embodiment identifies keywords within the feature metadata using any suitable semantic analysis technique.

Because a code repository tracks information relating to implementing particular application features, the repository typically includes information relating particular features to a theme. For example, repository entries for the example travel application might be tagged with an identifier such as "reservation" or "flight search", which are semantically similar, using a semantic similarity measure, to the example travel application's theme of travel reservations. As a result, by matching the wireframe theme to entries in the repository an embodiment obtains a list of repository entries describing features which would likely need to be implemented in a back-end application corresponding to the wireframe.

Once an embodiment has a set of repository entries describing one or more features, the embodiment extracts a back-end application feature from a description. The extracted feature describes functionality to be implemented in a back-end application to service a data request from the front-end application. Then an embodiment uses source code associated with the repository entry to generate a back-end application stub corresponding to the back-end feature. An embodiment presents the stub to a human developer as part of the embodiment's suggestions for back-end code that will likely need to be implemented to service requests from the front-end application generated from the original wireframe.

An embodiment can customize stub generation and presentation to a developer's preferences. A developer's preferences can include a programming language, code package, source code style, and other preferences associated with source code generation. The preferences can be set on a per-project or per-developer basis, or preconfigured for a particular implementation of an embodiment.

A machine-learning enabled embodiment can also be configured to include a learning model for theme identification or for relating a theme to entries in a feature repository. One embodiment tracks a developer's acceptance or rejection of generated back-end code stubs. Stub acceptance indicates that the theme identification and feature identification were correct. Rejection of only one stub in a set of stubs indicates that the theme identification was correct, but there was an error identifying a particular feature. Rejection of all or most of a set of stubs indicates that the theme identification was incorrect, causing additional errors identifying features associated with the theme. Thus, an embodiment uses a developer's stub acceptance and rejection to refine the appropriate learning model.

The manner of back-end application code stub generation from a front-end application wireframe described herein is unavailable in the presently available methods in the technological field of endeavor pertaining to automated code generation. A method of an embodiment described herein, when implemented to execute on a device or data processing system, comprises substantial advancement of the functionality of that device or data processing system in generating back-end stubs corresponding to front-end code generated from a particular wireframe.

The illustrative embodiments are described with respect to certain types of wireframes, graphical elements, textual elements, typographical attributes, front-end functionality, back-end functionality, websites, analyses, thresholds, sorting methods, model refinements, adjustments, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
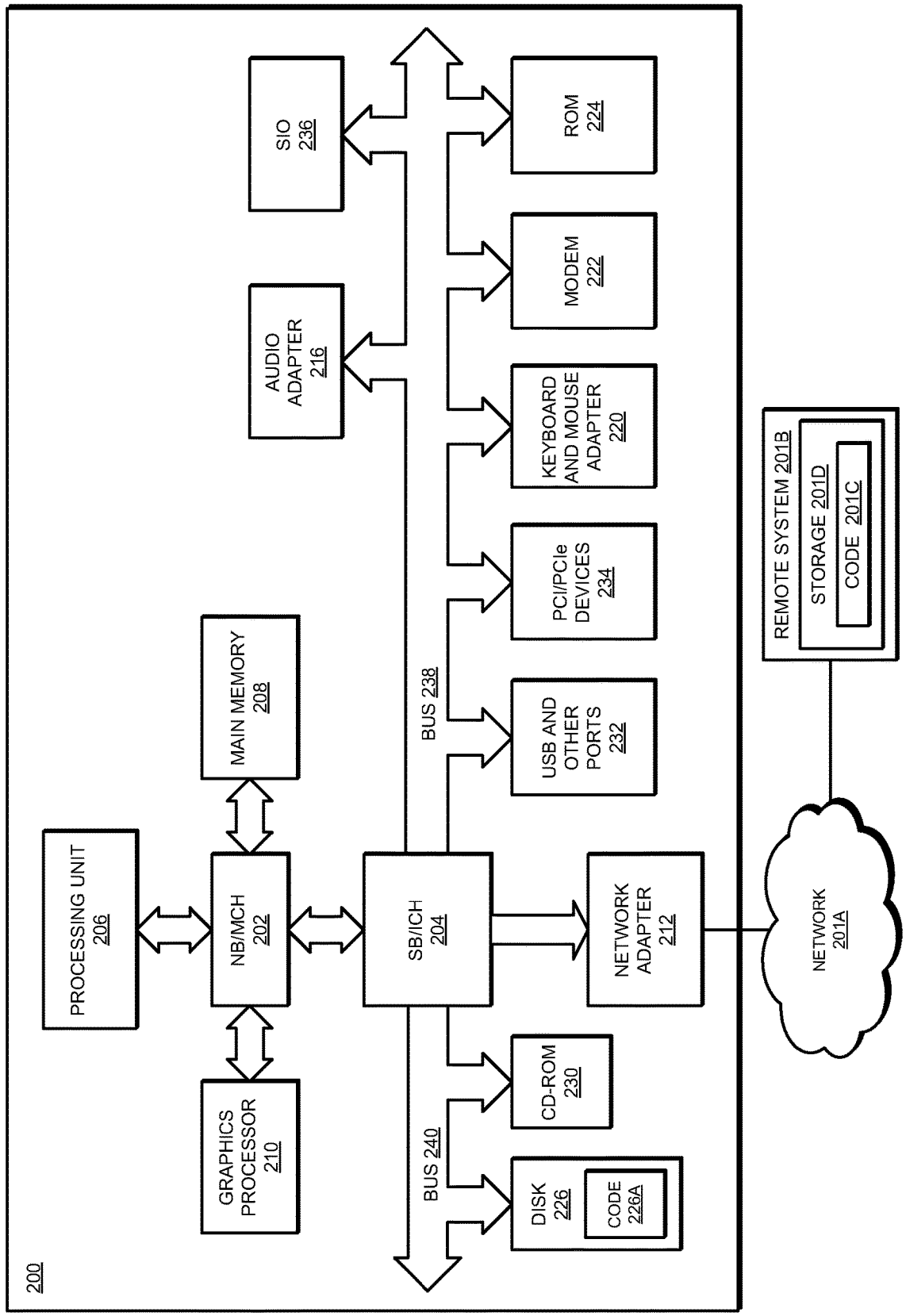
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
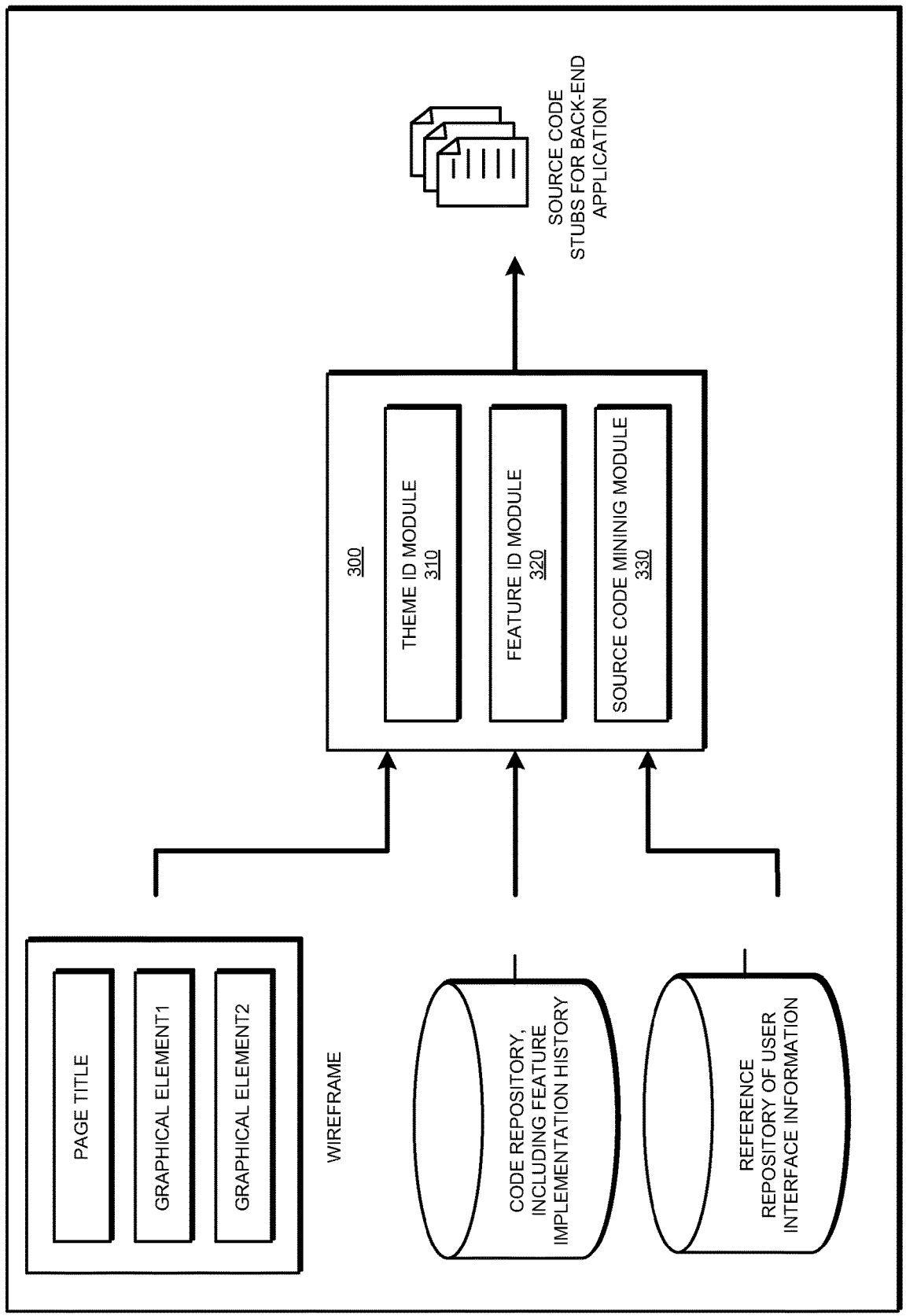
FIG. 3 depicts a block diagram of an example configuration for back-end application code stub generation from a front-end application wireframe in accordance with an illustrative embodiment.

With reference to FIG. 3, this figure depicts a block diagram of an example configuration for back-end application code stub generation from a front-end application wireframe in accordance with an illustrative embodiment. Application 300 is an example of application 105 in FIG. 1 and executes in any of servers 104 and 106, clients 110, 112, and 114, and device 132 in FIG. 1.

Application 300 takes, as input, a wireframe. including a set of user-facing graphical elements. Each element includes layout information for the element, such as a bitmap or other graphical representation of an element, as well as an element's size, shape, color, location relative to other elements in a display, and the like. Each element can also include textual information, such as a text string, font and font size specification for the text, and the like.

Application 300 also takes, as input, a reference repository of user interface information. The reference repository can be a reference collection of standard, or often-used, user interface layouts that is collated and preprocessed for an embodiment's use, a publicly-available collection of websites or the user interfaces of front-end applications, or a combination of the two.

Application 300 also takes, as input, a code repository including a feature implementation history. A code repository stores information relating to feature implementation for one or more software projects. A code repository typically includes information relating to software version control, bug tracking, feature requests, task management, and other information relating to feature implementation. A code repository also relates feature metadata to source code of the implementation. A code repository can be a publicly-available, general-use repository, or specifically designed for use in a particular style of software development or restricted to a particular group of developers.

Theme identification module 310 analyzes elements of a wireframe to identify a theme of the wireframe. More detail of module 310 is described with reference to FIG. 4.

Feature identification module 320 searches a code repository to discover one or more entries related to the theme. In particular, module 320 discovers one or more entries related to the theme, as stored in the code repository, by searching the repository for one or more keywords that are the same or semantically similar (above a threshold degree of similarity as measured by a similarity measure in a manner described herein) to the theme or the text of elements in the wireframe. Module 320 identifies keywords within the feature metadata using any suitable semantic analysis technique. Because a code repository tracks information relating to implementing particular application features, the repository typically includes information relating particular features to a theme. As a result, by matching the wireframe theme to entries in the repository module 320 obtains a list of repository entries describing features which would likely need to be implemented in a back-end application corresponding to the wireframe.

Source code mining module 330 extracts a back-end application feature from a description. The extracted feature describes functionality to be implemented in a back-end application to service a data request from the front-end application. Then module 330 uses source code associated with the repository entry to generate a back-end application stub corresponding to the back-end feature.

Figure 4:
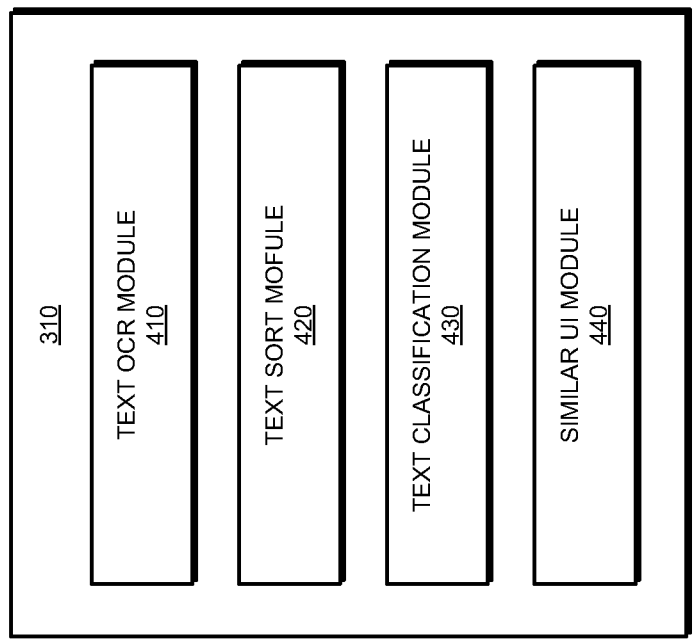
FIG. 4 depicts a block diagram of an example configuration for back-end application code stub generation from a front-end application wireframe in accordance with an illustrative embodiment.

With reference to FIG. 4, this figure depicts another block diagram of an example configuration for back-end application code stub generation from a front-end application wireframe in accordance with an illustrative embodiment. In particular, FIG. 4 depicts more detail of theme identification module 310 in FIG. 3.

Text OCR module 410 performs OCR, if necessary, on the set of user-facing graphical elements in a wireframe. Text sort module 420 sorts the graphical elements of the wireframe by a typographical attribute of the elements, then selects the text of the element at one end of the sorted list as the theme. In one implementation, module 420 can be configured to identify the most prominent text in a wireframe by sorting by the font size of each element, then selecting the element having the largest font size. If there are multiple elements with the same largest font size, the embodiment breaks the tie using another typographical attribute of the elements, such as an alignment or font of the elements. Text classification module 430 classifies text of the elements in the wireframe into a theme, based on a static set of rules or using a learning model previously trained to identify a theme from sets of textual training data. Similar user interface (UI) module 440 searches within a reference repository of user interface information for a user interface layout, with a title, that is above a threshold degree of similarity (as measured by a similarity measure) with the elements of the wireframe being analyzed. The embodiment then uses the title as the theme.

Figure 5:
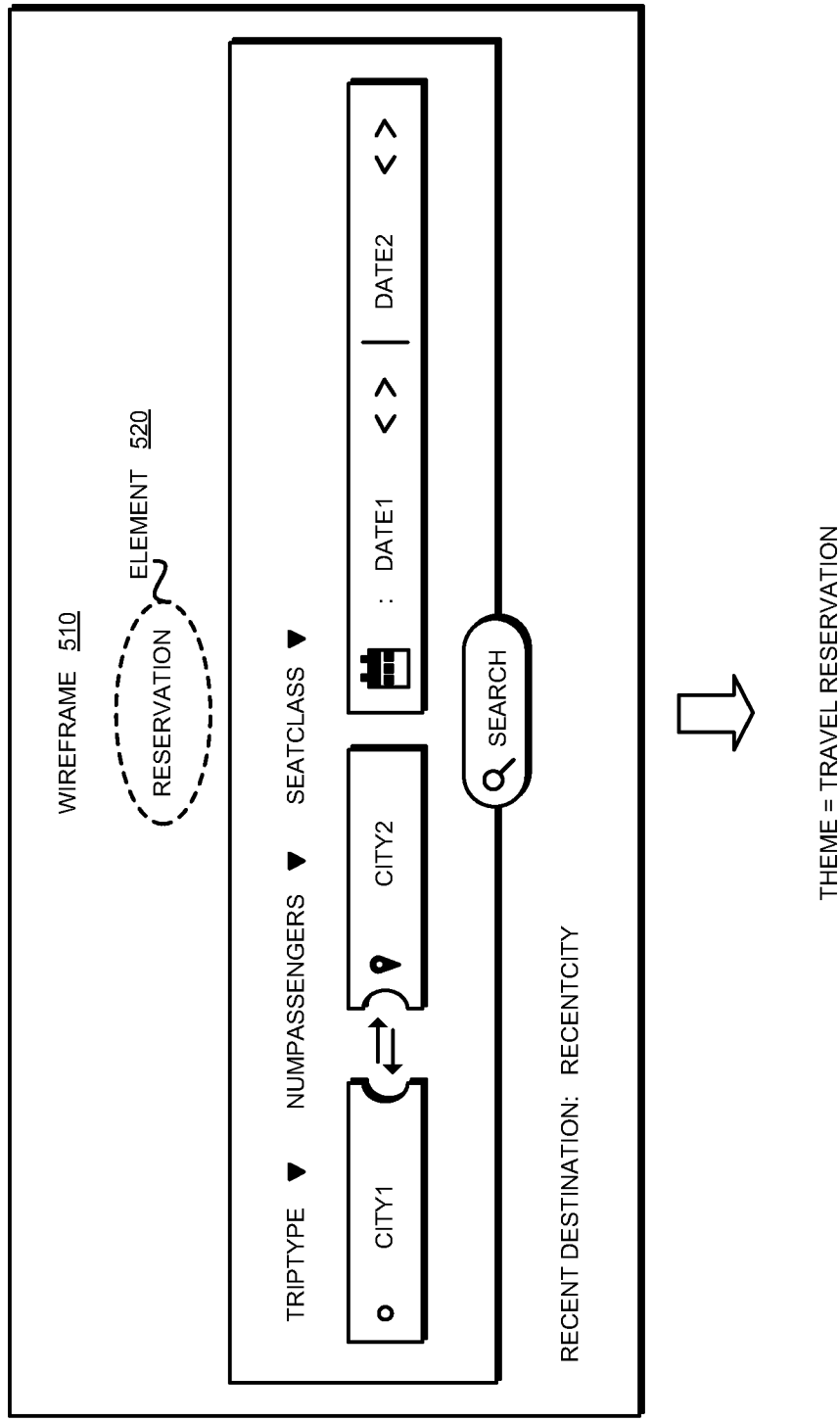
FIG. 5 depicts an example of analyzing a wireframe, using an example configuration for back-end application code stub generation from a front-end application wireframe in accordance with an illustrative embodiment.

With reference to FIG. 5, this figure depicts an example of analyzing a wireframe, using an example configuration for back-end application code stub generation from a front-end application wireframe in accordance with an illustrative embodiment. The example can be executed using application 300 in FIG. 3.

Wireframe 510 is a wireframe for a portion of a travel application, intended to provide reservation functionality. Wireframe 510 includes a set of user-facing graphical elements, such as element 520.

To identify a theme corresponding to wireframe 510, application 300 attempts to identify a title for wireframe 510, then uses the identified title as the theme. In particular, application 300 sorts the graphical elements of wireframe 510 by a typographical attribute of the elements, then selects the text of the element at one end of the sorted list as the theme. In particular, as depicted application 300 has sorted the elements in order of their appearance in the wireframe layout and determined that element 520, with the text "Reservation", is at the top of the layout and centered horizontally. As a result, application 300 has identified the theme of wireframe 510 as relating to a travel reservation.

Figure 6:
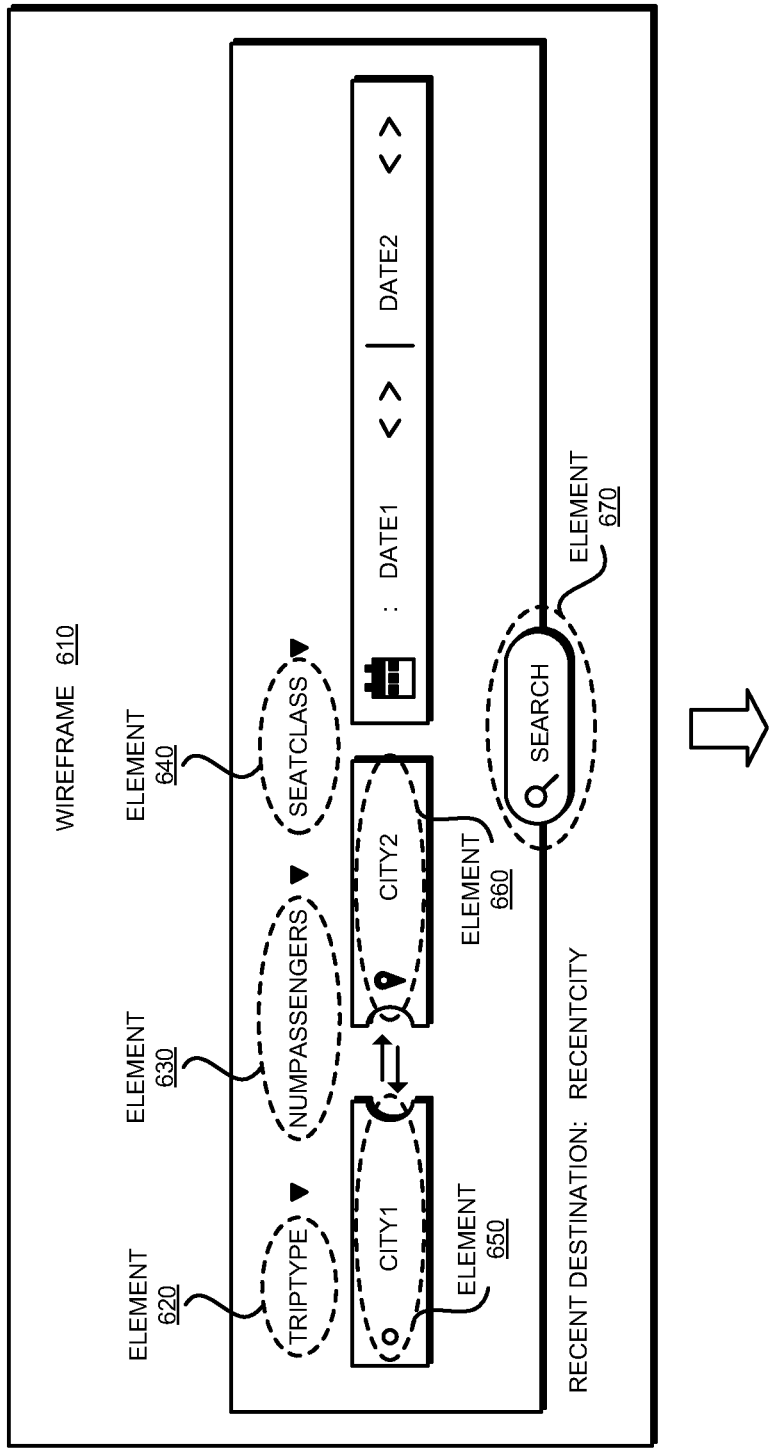
FIG. 6 depicts another example of analyzing a wireframe, using an example configuration for back-end application code stub generation from a front-end application wireframe in accordance with an illustrative embodiment.

With reference to FIG. 6, this figure depicts another example of analyzing a wireframe, using an example configuration for back-end application code stub generation from a front-end application wireframe in accordance with an illustrative embodiment. The example can be executed using application 300 in FIG. 3.

Wireframe 610 is a wireframe for a portion of a travel application, intended to provide reservation functionality. Wireframe 610 includes a set of user-facing graphical elements, such as elements 620, 630, 640, 650, 660, and 670. Unlike wireframe 510, wireframe 610 does not include a title application 300 can identify by sorting the graphical elements of the wireframe by a typographical attribute of the elements, then selecting the text of the element at one end of the sorted list as the theme.

Instead, application 300 attempts to identify a theme for the wireframe using the text of the graphical elements in wireframe 610, such as elements 620, 630, 640, 650, 660, and 670. In particular, application 300 classifies text of the elements in the wireframe into a theme. Here, because text of the elements in the wireframe includes text such as "TripType", "NumPassengers", "City1", "City2", "Date1", "Date2", and "Search", this wireframe has a higher probability of relating to travel reservations than to any other known theme.

Figure 7:
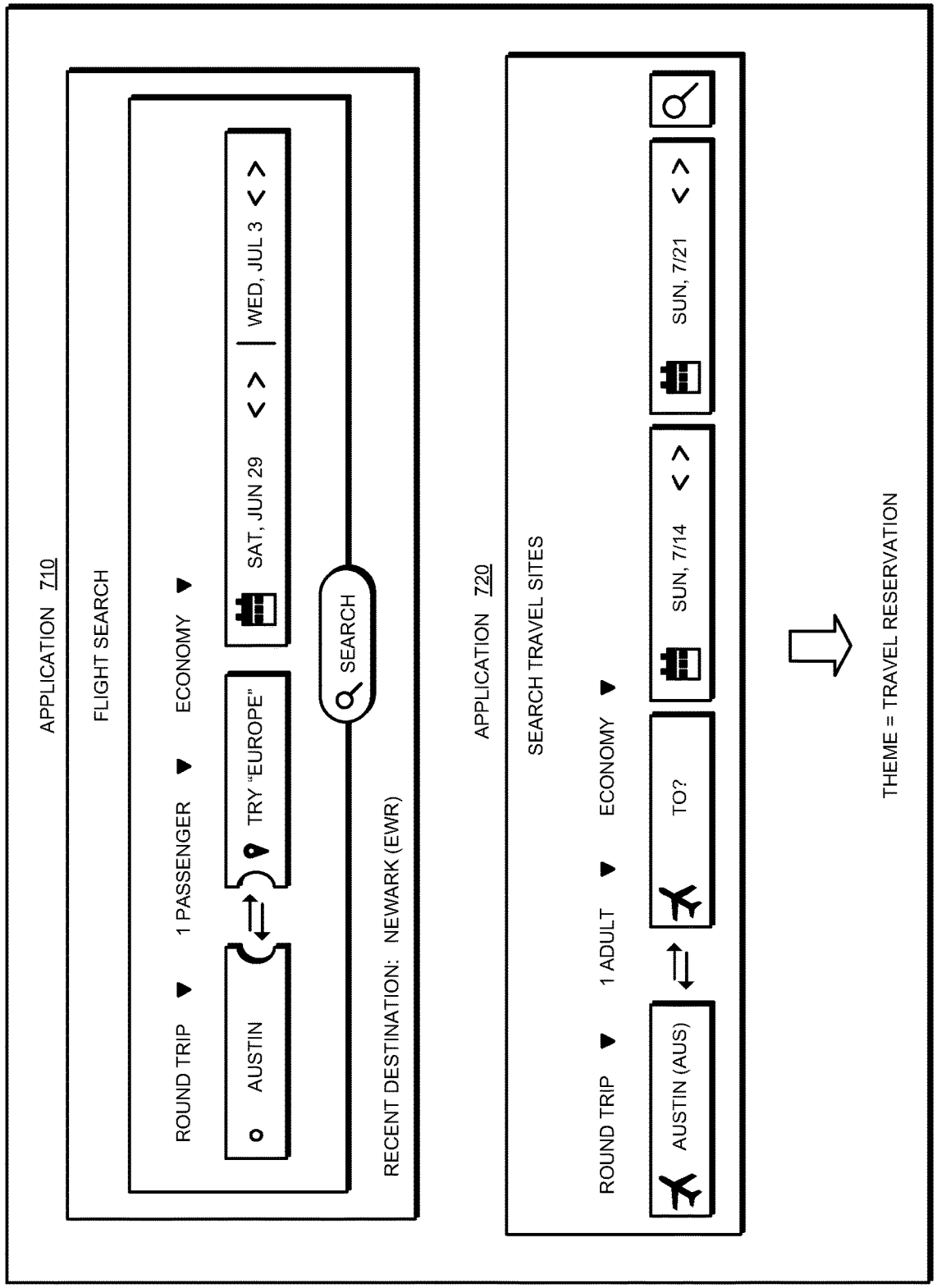
FIG. 7 depicts another example of analyzing a wireframe, using an example configuration for back-end application code stub generation from a front-end application wireframe in accordance with an illustrative embodiment.

With reference to FIG. 7, this figure depicts another example of analyzing a wireframe, using an example configuration for back-end application code stub generation from a front-end application wireframe in accordance with an illustrative embodiment. The example can be executed using application 300 in FIG. 3.

FIG. 7 depicts a reference repository of user interface information, for use in identifying a theme for a wireframe for a portion of a travel application. Both application 710 and application 720 include user interface elements for a travel application. Application 710 includes a title, "Flight Search". Application 720 also includes a title, "Search Travel Sites".

Application 300 searches within the reference repository for a user interface layout, with a title, that is above a threshold degree of similarity (as measured by a similarity measure) with the elements of the wireframe being analyzed. Here, application 300 has found applications 710 and 720, with titles that are above a threshold degree of similarity with the elements of the wireframe. Thus, application 300 uses a synonym of the above-threshold titles, "travel reservation", as the wireframe theme.

Figure 8:
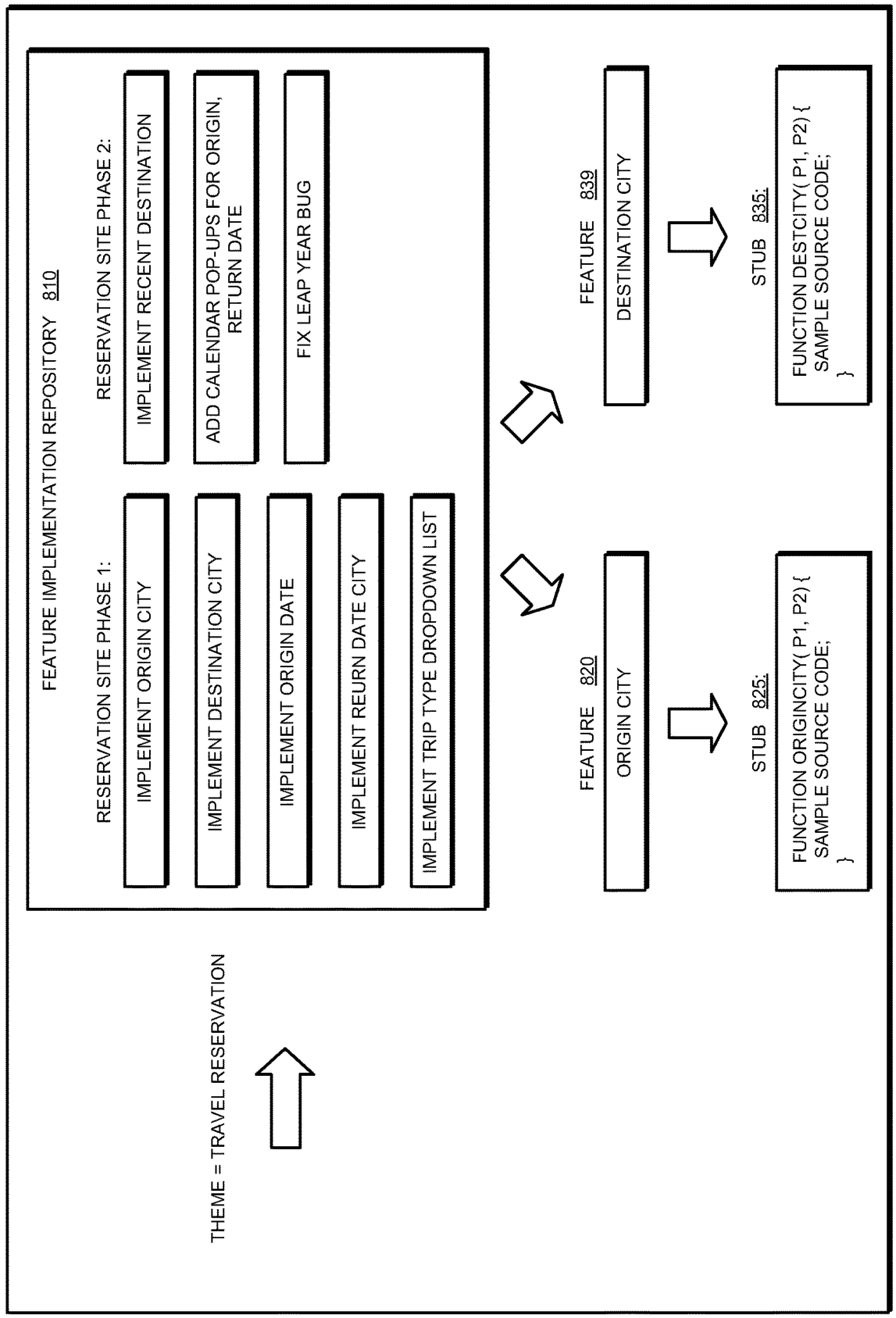
FIG. 8 depicts an example of using an example configuration for back-end application code stub generation from a front-end application wireframe in accordance with an illustrative embodiment.

With reference to FIG. 8, this figure depicts an example of using an example configuration for back-end application code stub generation from a front-end application wireframe in accordance with an illustrative embodiment. The example can be executed using application 300 in FIG. 3.

As depicted, application 300 has identified a theme for an example input wireframe—"travel reservation". As a result, application 300 searches code repository 810 to discover one or more entries related to the theme. Code repository 810 stores information relating to feature implementation for one or more software projects.

As depicted, application 300 has searched repository 810 for one or more keywords that are the same or semantically similar (above a threshold degree of similarity as measured by a similarity measure in a manner described herein) to the theme, travel reservation, of the example wireframe. As a result, application 300 has identified a number of repository entries relating to the example travel application and created a list of repository entries describing features which would likely need to be implemented in a back-end application corresponding to the wireframe. Once application 300 has a set of repository entries describing one or more features, application 300 extracts a back-end application feature from a description. The extracted feature describes functionality to be implemented in a back-end application to service a data request from the front-end application. As depicted, two of those features are feature 820 and feature 830. Then application 300 uses source code associated with the repository entry to generate a back-end application stub corresponding to the back-end feature. Thus, application 300 has extracted stub 825 corresponding to feature 820 and stub 835 corresponding to feature 830.

Figure 9:
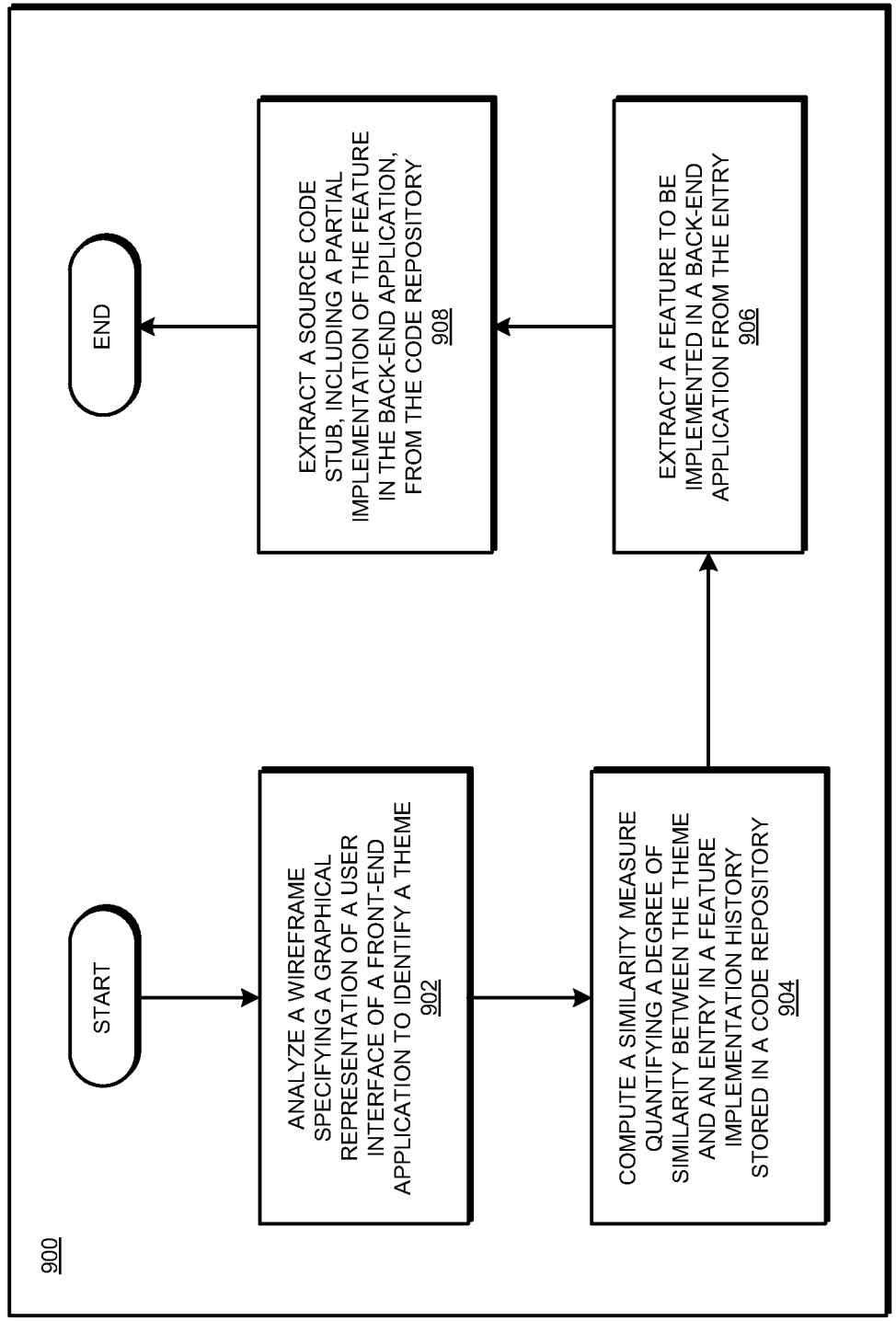
FIG. 9 depicts. a flowchart of an example process for back-end application code stub generation from a front-end application wireframe in accordance with an illustrative embodiment.

With reference to FIG. 9, this figure depicts a flowchart of an example process for back-end application code stub generation from a front-end application wireframe in accordance with an illustrative embodiment. Process 900 can be implemented in application 300 in FIG. 3.

In block 902, the application analyzes a wireframe specifying a graphical representation of a user interface of a front-end application to identify a theme. In block 904, the application computes a similarity measure quantifying a degree of similarity between the theme and an entry in a feature implementation history stored in a code repository. In block 906, the application extracts a feature to be implemented in the back-end application from the entry. In block 908, the application extracts a source code stub, including a partial implementation of the feature in the back-end application, from the code repository. Then the application ends.

Figure 10:
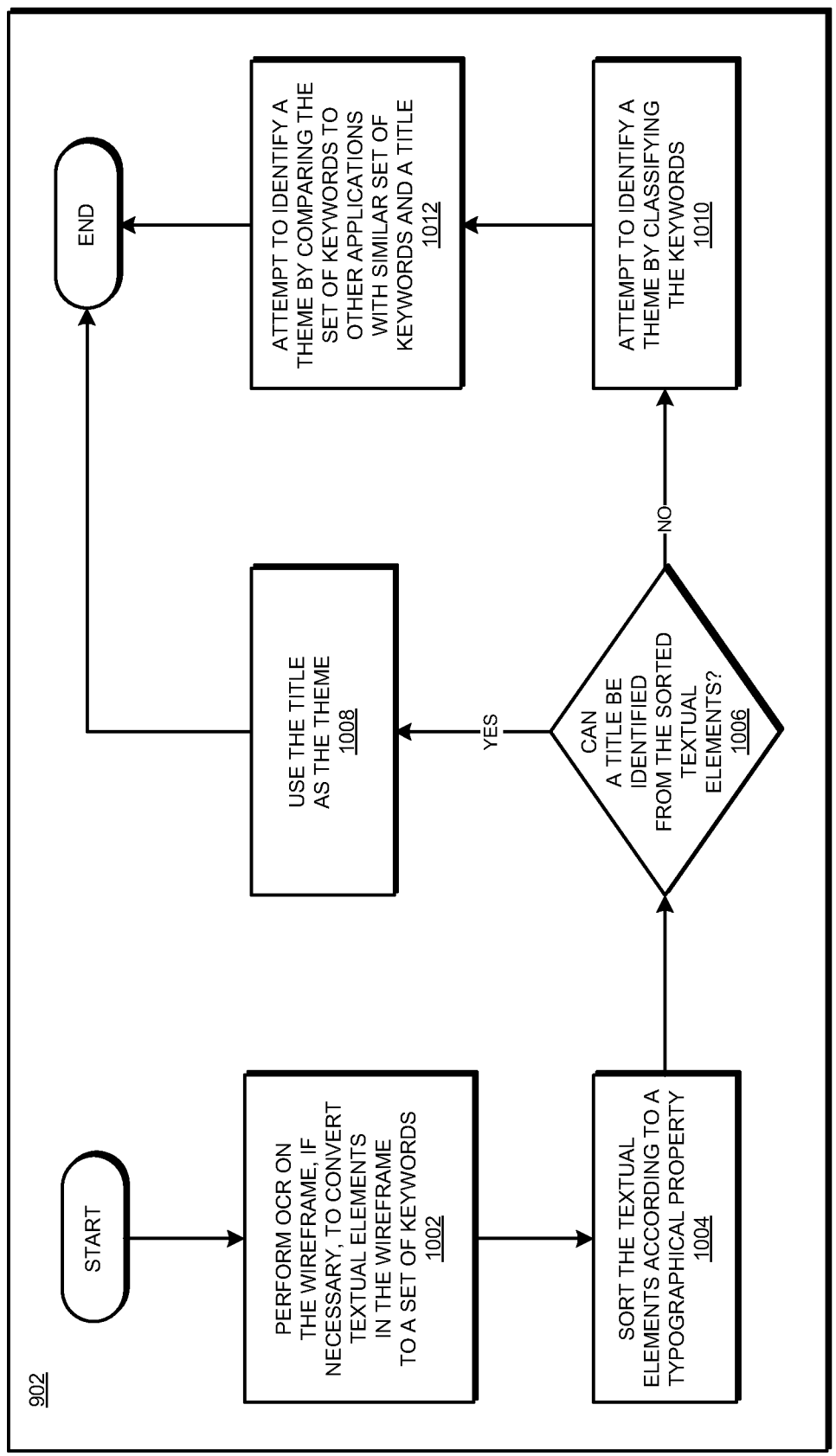
FIG. 10 depicts a flowchart of another example process for back-end application code stub generation from a front-end application wireframe in accordance with an illustrative embodiment.

With reference to FIG. 10, this figure depicts a flowchart of another example process for back-end application code stub generation from a front-end application wireframe in accordance with an illustrative embodiment. Block 902 is the same as block 902 in FIG. 9.

In block 1002, the application performs OCR on the wireframe, if necessary, to convert textual elements in the wireframe to a set of keywords. In block 1004, the application sorts the textual elements according to a typographical property. In block 1006, the application checks whether a title can be identified from the sorted textual elements. If yes ("YES" path of block 1006), in block 1008 the application uses the title as the theme, then ends. Otherwise ("NO" path of block 1006), in block 1010, the application attempts to identify a theme by classifying the keywords. In block 1012, the application attempts to identify a theme by comparing the set of keywords to other applications with a similar set of keywords and a title. Then the application ends.

Thus, a computer implemented method is provided in the illustrative embodiments for back-end application code stub generation from a front-end application wireframe and other related features, functions, or operations. Where an embodiment or a portion thereof is described with respect to a type of device, the computer implemented method, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, by analyzing a wireframe, a theme of the wireframe, the wireframe comprising a set of graphical elements, the set of graphical elements specifying a graphical representation of a user interface of a front-end application, the theme comprising a title, the title comprising a textual element of a graphical element of the wireframe that describes a portion of the wireframe, the front-end application implementing, during execution, the set of graphical elements;
   identifying an entry related to the theme in a feature implementation history stored in a code repository, the entry identified by determining that a similarity measure quantifying a degree of similarity between the theme and the entry is above a threshold value;
   extracting, from the entry, a first feature of a back-end application, the first feature, when implemented within the back-end application and while the back-end application and the front-end application are executing, performing a data manipulation responsive to a data request from the front-end application; and
   partially implementing, by integrating a source code stub associated with the entry with source code of the back-end application, the first feature in the back-end application, the source code stub comprising a temporary substitute for source code to be implemented to service a request from a first graphical element in the set of graphical elements in the wireframe.

2. The computer-implemented method of claim 1, wherein analyzing the wireframe comprises:
   ordering, according to a typographical property of each textual element in the set of graphical elements, the set of graphical elements; and
   identifying, as the theme, a first element in the ordered set of graphical elements, wherein the first element occupies a head position in the ordered set.

3. The computer-implemented method of claim 2, wherein analyzing the wireframe comprises:
   classifying text of the set of graphical elements, the classifying identifying the theme.

4. The computer-implemented method of claim 1, wherein analyzing the wireframe comprises:
   determining, for a reference user interface of a reference front-end application including a reference set of textual elements, that a similarity score computed relative to text of the set of graphical elements is above a threshold similarity score;
   ordering, according to a typographical property of each textual element in the reference set of textual elements the reference set of textual elements; and
   identifying, as the theme, a first element in the ordered reference set of textual elements, wherein the first element occupies a head position in the ordered set.

5. The computer-implemented method of claim 4, wherein the reference user interface of the reference front-end application is stored in a user interface repository.

6. The computer-implemented method of claim 1, further comprising:
   generating, using a semantic analysis performed on text of the entry, a set of keywords corresponding to the entry; and
   computing for the theme relative to the set of keywords, the similarity measure.

* * * * *